United States Patent [19]

Moss et al.

[11] Patent Number: 5,210,625

[45] Date of Patent: May 11, 1993

[54] HOLOGRAPHIC EFFICIENCY ADJUSTMENT

[75] Inventors: Gaylord E. Moss, Marina del Rey; Kevin Yu, Temple City; John E. Wreede, Azusa, all of Calif.

[73] Assignee: Hughes Aircraft Company, Los Angeles, Calif.

[21] Appl. No.: 677,224

[22] Filed: Mar. 29, 1991

[51] Int. Cl.⁵ .............................................. G03H 1/08
[52] U.S. Cl. .......................................... 359/1; 359/9; 359/900; 430/1; 430/2
[58] Field of Search ................... 359/1, 9, 12, 21, 900; 430/1, 2

[56] References Cited

U.S. PATENT DOCUMENTS

| | | | |
|---|---|---|---|
| 3,619,022 | 11/1971 | Hirsch et al. | 359/9 |
| 4,960,311 | 10/1990 | Moss et al. | 359/9 |
| 4,966,428 | 10/1990 | Phillips | 359/9 |
| 4,969,700 | 11/1990 | Haines | 359/9 |
| 5,003,386 | 3/1991 | Doyle et al. | 359/12 |

Primary Examiner—Bruce Y. Arnold
Assistant Examiner—Martin Lerner
Attorney, Agent, or Firm—L. A. Alkov; W. K. Denson-Low

[57] ABSTRACT

A hologram efficiency adjusting process that includes scanning the brightness effect of a hologram, which is either the hologram to be adjusted or a hologram representative of the hologram to be adjusted, to provide brightness vs. position information. The brightness information is utilized to produce a variable duty cycle half-tone mask that contains a pattern defining the areas of the hologram which are to be removed, with the pattern being unresolvable by the viewer of the hologram from which holograms have been removed pursuant to the mask pattern. The hologram to be adjusted is then photoresist coated and etched in accordance with the mask. Alternatively, the brightness information can be utilized to directly expose, for example by a laser scanner, photoresist disposed on the hologram to be adjusted.

3 Claims, 4 Drawing Sheets

HOLOGRAPHIC EFFICIENCY ADJUSTMENT

BACKGROUND OF THE INVENTION

This present invention is directed generally to hologram fabricating techniques, and is directed more particularly to a technique for controlling effective diffraction efficiency in holograms.

In the manufacture of holograms such as those utilized for vehicle head-up display systems, it may be desirable to closely control hologram efficiency and bandwidth within narrow limits to meet the required optical performance. This is due to the interrelationships between parameters including diffraction efficiency, see-through and angular bandwidth.

However, reproducibility of holograms having the desired efficiency and bandwidth is difficult due to the extreme sensitivity of hologram performance to a variety of factors in the recording process. Some of these factors include:

1. Recording material: age, storage conditions, pre-exposure hardening, molecular composition and moisture content.
2. Chemical processing: temperature, time, agitation, chemical concentration and subsequent drying conditions.
3. Laser exposure: beam power, time, coherence length, beam ratio and mechanical stability. With present techniques, it is difficult to precisely control all of these parameters, and manufacturing yield tends to be quite low.

Present techniques to meet tight diffraction efficiency requirements are directed to precisely controlling the hologram manufacturing parameters. However, such tight control is extremely difficult to achieve with some materials such as dichromated gelatin, wherein recording involves molecular crosslinking that is non-linearly affected by such parameters as the organic molecular structure of animal protein, temperature, moisture content, laser exposure energy, gelatin rate during film coating, previous history of the gelatin molecules, rate of dehydration after wet processing, swelling of the gelatin during processing, time and temperature of baking after processing, and others.

Presently, the recording medium thickness is selected to provide the desired bandwidth, then all other fabrication parameters are selected and controlled to give the desired diffraction efficiency. In particular, a diffraction efficiency vs. effective exposure curve indicates the relationship of diffraction efficiency to effective exposure, wherein the effective exposure level includes all the variable in recording material, laser exposure and chemical processing. In view of the number of exposure variables and their non-linearity and sensitivity to many factors, attempting to control diffraction efficiency by tightly controlling exposure parameters is exceedingly difficult.

SUMMARY OF THE INVENTION

It would therefore be an advantage to provide a hologram diffraction control technique which provides for tight diffraction efficiency control accurately and reproducibly despite large variations and non-linearities in the holographic recording materials and processes.

Another advantage would be to provide for improvement or correction of non-uniformities in an existing hologram.

A further advantage would be to provide a uniform hologram playback display as viewed from a particular position or positions.

The foregoing and other advantages are provided by the invention in a hologram efficiency adjusting process that includes scanning the brightness effect of a hologram, which is either the hologram to be adjusted or a hologram representative of the hologram to be adjusted, to provide brightness vs. position information. The brightness information is utilized to produce a variable duty cycle half-tone mask that contains a pattern defining the areas of the hologram which are to be removed, with the pattern being unresolvable by the viewer of the hologram from which hologram areas defined by the mask have been removed. The hologram to be adjusted is then photoresist coated and etched in accordance with the mask. Alternatively, the brightness information can be utilized to directly expose, for example by a laser scanner, photoresist disposed on the hologram to be adjusted.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
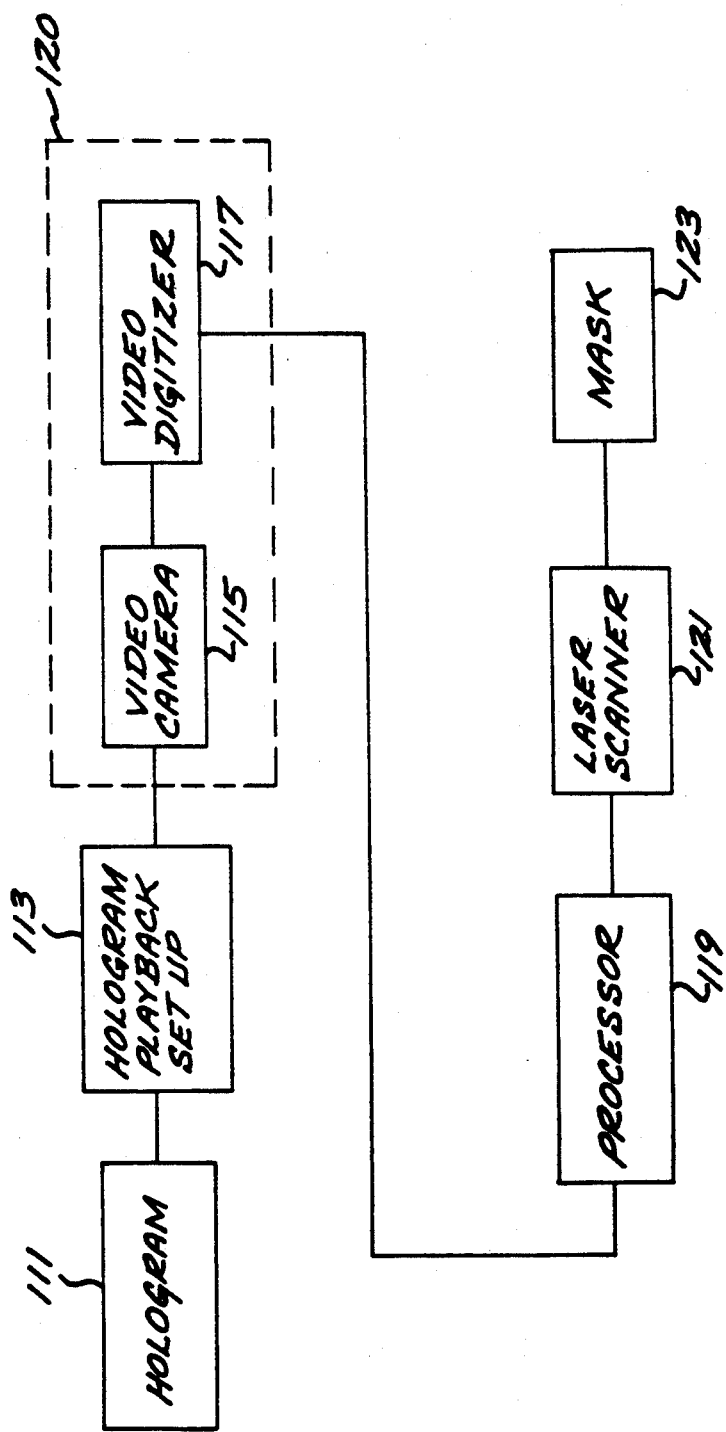
FIG. 1 is a block diagram schematically depicting components for producing a mask in accordance with the disclosed hologram diffraction efficiency adjustment techniques.

In the following detailed description and in the several figures of the drawing, like elements are identified with like reference numerals.

Referring now to FIG. 1, shown therein is a block diagram of components for adjusting holographic efficiency in accordance with the invention. A hologram 111, which is the hologram to be adjusted for efficiency or a hologram representative of the hologram to be adjusted for efficiency, is initially made with the proper bandwidth and adjusted for the proper wavelength, but with a greater than desired efficiency. The hologram 111 is then utilized in a hologram playback setup 113 that simulates the intended playback system, comprising for example a replica of the intended playback system. The playback of the hologram 111 is scanned by an optical scanner 120 that includes a computer positioned video camera 115 whose output is provided to a video digitizer 117 having a frame grabber function. The scanner provides photopic brightness data to a processor 119 which stores and then later processes the stored photopic brightness data. By way of illustrative example, the video camera comprises a Javelin JE2362 and the video digitizer comprises a Data Transmission DT2853 with a frame grabber.

Figures 2, 3:
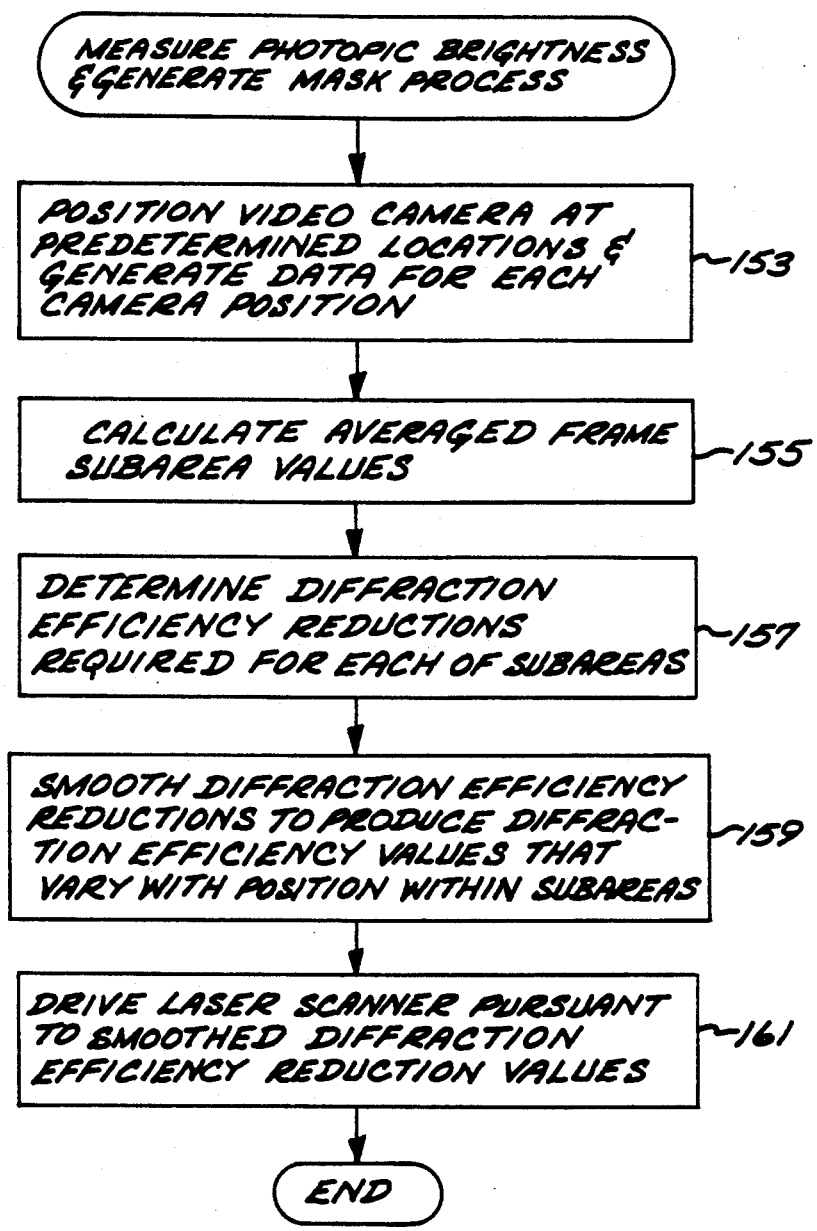
FIG. 2 is a flow diagram illustrating a procedure performed by the scanner, processor, and laser scanner of FIG. 1 for measuring the photopic brightness of a hologram and generating a mask for modifying the hologram or a hologram that it represents.
FIG. 3 schematically illustrates the division of a video frame into frame subareas.

Referring now to FIG. 2. set forth therein is a procedure for measuring the photopic brightness of the hologram and generating a mask for modifying the hologram 111 or a hologram that it represents.

At 151 the hologram 111 is installed and played back in the playback setup 113 that simulates the intended playback installation.

At 153 the video camera 115 is positioned at M predetermined locations within the eyebox for the hologram playback, and at each location is aimed so that the hologram occupies the same area in the field of view of the video camera, for example by positioning the center of the hologram in the center of the image. For each camera location, the hologram is imaged and a single sample frame is utilized to produce a set of photopic brightness data comprising respective averaged brightness data for subareas of the sample frame for that camera location, wherein a sample frame comprises a matrix of pixel data wherein each pixel data has a brightness value between 0 and 256, and wherein a subarea comprises a submatrix of pixel data. In particular, the sample frames for all camera positions are respectively divided into identical matrices, each having N predetermined subareas which can be contiguous or non-contiguous areas. FIG. 3 schematically illustrates the notion of subareas for a simplified example of dividing a sample frame 111 into a matrix of 9 contiguous subareas. Utilizing averages of subareas of a sample frame is like having bigger pixels that respectively correspond to the subareas. In practice, the number of subareas N utilized will depend on the hologram application and the extent of non-uniformity found in the typical hologram made for that application. For example, for a 10 inch by 12 inch hologram for an automotive head up display, 100 subareas in a 10 by 10 arrangement would be reasonably sufficient. In a more critical application, a 100 by 100 matrix might be more appropriate. For each subarea J of every frame sample I, where J=1,N and I=1,M, a single an average subarea photopic value P(I,J) is calculated. The subarea photopic values for each sample frame can be directly provided by the scanner, for example by use of the previously identified commercially available equipment, or they can be calculated by the processor by averaging the pixel data for each subarea of each sample frame, where a single frame is utilized for each camera position.

At 155 the data for corresponding subareas of all sample frames (i.e., for those subareas in the same location in the image frame) are utilized to calculated a subarea average PAV(J) for each of the frame subareas. The result is a set subarea averages PAV(J) that represent brightness vs. position information for the image subareas 1 through N. In other words, the set of subarea averages comprise the subarea values for an averaged sample frame.

At 157 the set of subframe averages are then processed to arrive at percentage amounts of efficiency reduction required to change localized efficiencies so as to achieve the desired result, for example a compromise of uniformity as viewed from anywhere in the eyebox or viewing region. In other words, a determination is made as to how much the diffraction efficiencies in each subarea needs to be reduced to achieve the desired overall result.

At 159 the percentage amounts of efficiency reduction determined at 157 are smoothed pursuant to known techniques so as to provide percentage amounts of reduction that vary with position within a subarea, which avoids abrupt changes at or between subarea boundaries.

At 161 the diffraction efficiency reduction values are then utilized to drive a laser scanner 121 (FIG. 1) to produce a mask 123 (FIG. 1) having an appropriate pattern that defines in a localized manner the areas of the hologram that are to be removed so as to achieve the desired percentage efficiency reduction. In particular, the mask comprises transparent and opaque areas that are sufficiently small to be unresolvable by the viewer of the hologram whose efficiency has been adjusted pursuant to the mask pattern, and the amount of percentage efficiency reduction is defined by the ratio of the removal areas to the non-removal areas. Whether the transparent areas or the opaque areas define the removal areas depends on the nature of the photoresist that is used for etching the hologram. By way of example, the mask pattern can comprise a first series of parallel lines in a first direction and a series of parallel lines orthogonal to the first series of lines.

Figure 4:
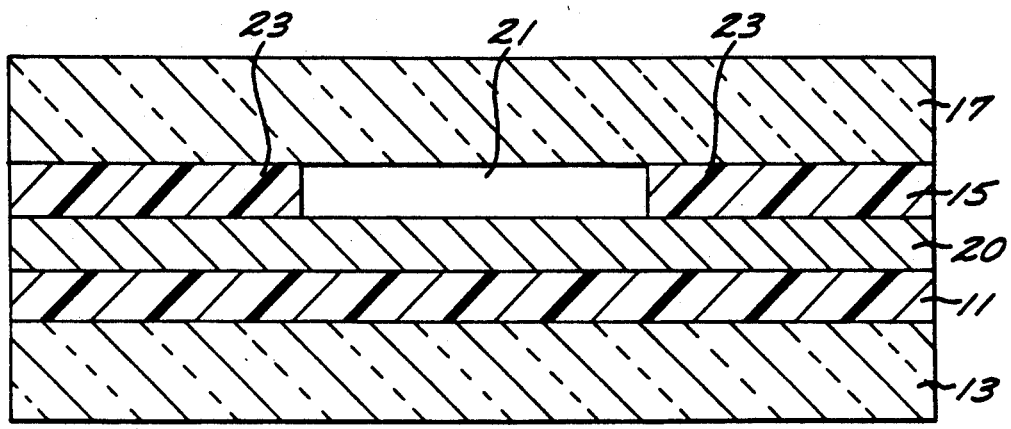
FIG. 4 is a schematic sectional view illustrating an etching arrangement utilizing a mask formed in accordance with FIG. 1 for selectively removing areas of a hologram to control the average overall diffraction efficiency of the hologram.
Figure 5:
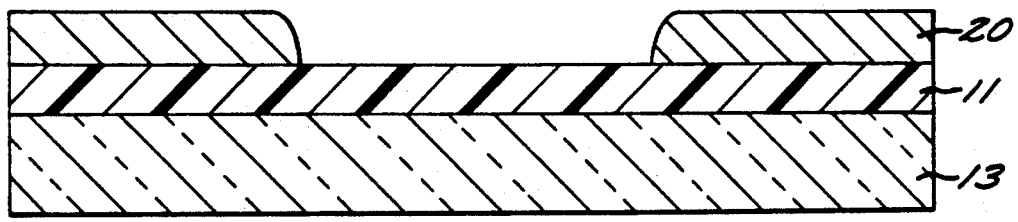
FIG. 5 is a schematic sectional view illustrating the photoresist and hologram of FIG. 4 after development of the exposed photoresist.
Figure 6:
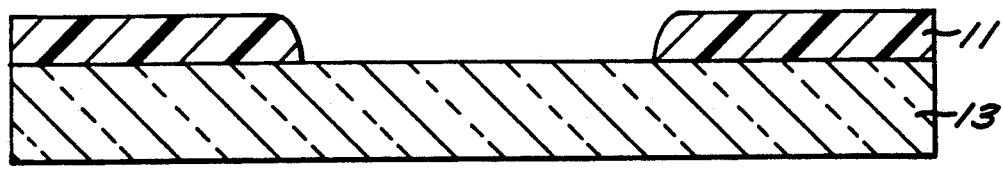
FIG. 6 is a schematic sectional view illustrating the photoresist and hologram of FIG. 5 after etching of the hologram.

Referring now to FIGS. 4–6, set forth therein is a masking arrangement for utilizing a mask 15 constructed pursuant to the foregoing for exposing a positive photoresist layer 20 disposed on the hologram 11 which is supported by a substrate 13. The mask 15, which includes a plurality of opaque areas 23 separated by transparent area 21 is supported by a transparent mask substrate 17.

With the arrangement of FIG. 4, actinic illumination is directed through the mask 15 to the photoresist layer 20. As a result of the mask, only the areas of the photoresist layer 20 in registration with the transparent mask areas are exposed to the incident actinic illumination. The photoresist layer 20 is then developed to remove the areas thereof that were exposed, resulting in a structure as schematically depicted in FIG. 5.

After development of the photoresist layer 20, the hologram layer areas uncovered or opened by removal of the photoresist (i.e., the hologram layer areas in registration with the mask transparent areas) are etched pursuant to wet or dry etching techniques, for example, resulting in a structure as schematically depicted in FIG. 6.

Depending upon the photoresist materials, the hologram recording material, and the photoresist developing chemicals, the same chemicals can be utilized to develop the photoresist and to etch the hologram layer areas in registration with the exposed photoresist layer areas. However, some further etching may be required to complete the etching of the hologram layer.

After the selected areas of the hologram layer 11 as defined by the transparent ares of the mask are removed by etching, the remaining areas of the hologram layer comprise hologram containing areas which together have a net overall average diffraction efficiency that is selected by the proportion or percentage of the hologram containing areas (i.e., the areas protected by non-exposed photoresist areas as defined by the opaque areas of the mask), relative to the total area of use. Stated another way, net overall diffraction efficiency has been selected by controlling the ratio of the opaque and transparent mask areas 23, 21. For example, for a hologram that can be consistently produced for 90% efficiency in the hologram containing areas, an overall diffraction efficiency requirement of 45% would call for hologram containing areas of only 50% of the area of interest. In other words, the opaque areas of the mask would comprise 50% of the total areas of use.

While parallel lines were previously mentioned as an example of components of the mask, it should be appreciated that other patterns such as dots, squares, rectangles, and other polygons could be used. Linear shapes could also be utilized. While the size of the patterns will vary with the application, the appropriate size (therefore spacing) can be determined from the fact that the resolution of the human eye is approximately one minute of arc. For an automotive head up display where the driver's eye is 36 inches from the windshield, the spacing between dots should be 0.01 inches or less with the dot size determined by duty cycle or percentage of transparent area desired.

While the foregoing has been generally directed to the use of positive photoresist, it should be appreciated that negative photoresist areas not exposed to actinic illumination would be removed by development, and therefore the selected hologram areas to be removed would be define by the transparent areas of the mask.

After the hologram is etched, it can be re-tested and re-etched if appropriate.

Figure 7:
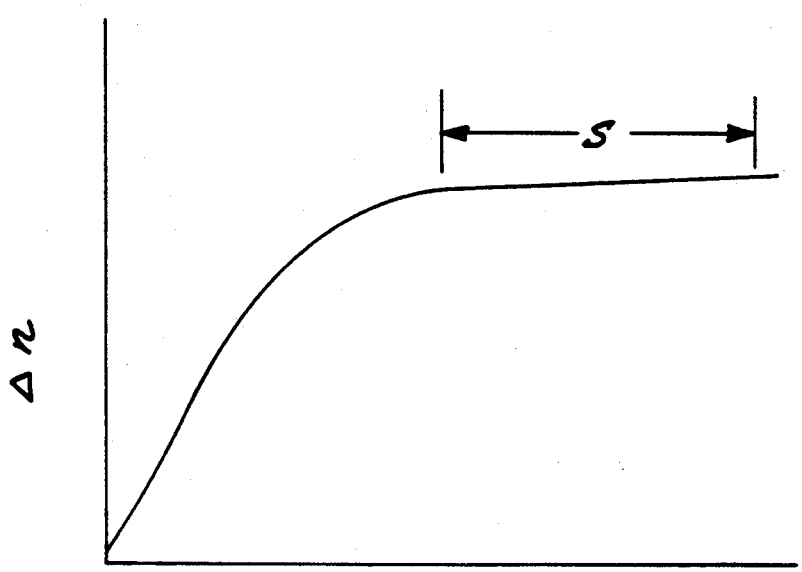
FIG. 7 is a typical index of diffraction vs. exposure curve for dichromated gelatin recording material.

Referring now to FIG. 7, shown therein is a response curve for dichromated gelatin hologram recording material showing index range (delta n) vs. effective exposure. Diffraction efficiency is directly related to the index range, and therefore the curve of FIG. 7 is indicative of diffraction efficiency. Effective exposure includes all variable in recording materials, laser exposure, and chemical processing. In accordance with the invention, the hologram forming exposure can be made in the saturated region S of the response curve where variations in effective exposure have a very small effect on diffraction efficiency.

In this manner, localized diffraction efficiency in the hologram exposure is precisely controlled and can be consistently reproduced, and overall net diffraction efficiency is precisely controlled by the percentage or ratio of hologram containing areas as defined by opaque areas of the mask 15.

Figure 8:
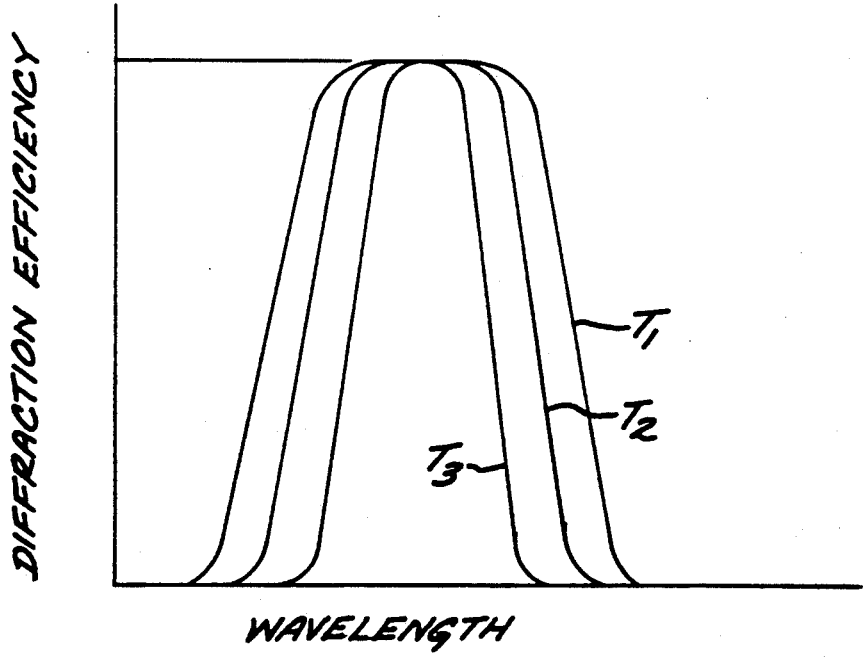
FIG. 8 set forth diffraction efficiency vs. wavelength curves for dichromated gelatin hologram recording media of different thicknesses for effective exposure in the saturated region of the diffraction index vs. exposure curve of FIG. 7.

FIG. 8 is helpful in illustrating the consistency of overall diffraction efficiency achieved with the exposure technique of the invention, and schematically depicts the bandwidth curves for a plurality of thicknesses T1, T2, T3 of dichromated gelatin hologram recording material as exposed in the saturation region of the index range vs. effective exposure curve. For a reasonable range of thicknesses, the resulting maximum localized diffraction efficiencies of the hologram exposed areas are close to the same level D2. Thus, with the technique of the invention, the desired bandwidth is utilized to select the thickness of the recording medium and the desired net overall efficiency is utilized to select the percentage of area of the exposure that is in the saturated region of the index/exposure response curve for that material.

For mass production purposes, it may be advantageous to utilize a recording process that provides for a substantially consistent diffraction efficiency above a predetermined minimum value, so that the same mask can be utilized for controlling diffraction efficiency of all copies of the same hologram, with the mask being formed on the basis of a representative example of the production holograms. For applications where a separate mask will be made for each hologram, the only requirement as to efficiency is that it be above a predetermined minimum.

It will be readily appreciated that basic scheme of the invention can be implemented in a number of ways. For example, instead of subjecting the hologram layer to hologram forming exposure and development, an alternate procedure would be to first mask and etch away selected areas of the hologram recording medium, and then subjecting the etched hologram recording medium to hologram forming exposure and development. The formation of the mask would be based on a hologram exposed and processed in accordance with the exposure and processing contemplated for the hologram recording medium. In this implementation, the mask is preferably coupled to the photoresist layer with an index matching fluid to prevent reflections from scattering into the unexposed hologram recording layer under the opaque areas of the mask. Such reflections would reduce the available index of refraction in the hologram layer for the holographic recording. For the same purpose, an appropriate coating is placed on the bottom of the substrate that supports the hologram recording layer. Such coating can be an absorptive coating to absorb light after it has passed through the hologram recording layer, or it can be an anti-reflection coating for coupling light after it has passed through the hologram recording medium. The anti-reflection coating need not be formed directly on the bottom of the hologram recording layer supporting substrate, but could be attached to an additional plate which is then index matched to the substrate.

As a further alternative, the laser scanner can be utilized to directly scan the photoresist layer with a UV laser, so as to avoid the intermediate step of making a mask.

The foregoing has been a disclosure of hologram diffraction efficiency adjustment techniques improve or correct non-uniformities in developed holograms, and which also produces holograms having a uniform display as viewed from a particular position or a range of positions. Such uniformity can be achieved without having a carefully controlled process for recording the hologram, and the average diffraction efficiency of the adjusted hologram can be controlled to any level that is lower than the lowest non-adjusted efficiency, and thus can be applied to non-adjusted holograms than are uniform. It should be noted that since the hologram adjustment is based on actual hologram operation, factors such as wavelength and bandwidth are being monitored together with efficiency. As such, non-uniform wavelength and an improper bandwidth can be corrected so long as photopic see-through is maintained. The adjustment possible will vary with the application, but since correction is available, the target bandwidth can be smaller and therefore the amount of adjustment possible is greater.

While the foregoing implementations of the invention have been directed to reflection holograms such as might be used as the combiner in a head-up display, the invention also contemplates diffraction efficiency adjustment of transmission holograms, such as might be used to direct the image.

Applications for diffraction efficiency adjusted holograms in accordance with the invention include military head-up displays, automotive head-up displays, automotive center high mounted stoplight systems, helmet visor displays, and head-down displays.

Although the foregoing has been a description and illustration of specific embodiments of the invention, various modifications and changes thereto can be made by persons skilled in the art without departing from the scope and spirit of the invention as defined by the following claims.

What is claimed is:

1. A method for controlling the diffraction efficiency of a hologram, comprising the steps of:
   reconstructing a hologram that is or is representative of the hologram to be adjusted;
   video scanning the hologram from a plurality of predetermined positions to provide brightness video data for each of the predetermined positions;
   producing from the brightness video data for all of the predetermined positions brightness vs. position information;
   producing from the brightness vs. position information a pattern that defines the areas of the hologram that are to be removed to achieve the desired reduction in diffraction efficiency; and
   etching the hologram in accordance with the pattern.

2. The method of claim 1 wherein the step of etching the hologram comprises the steps of:
   making a mask containing the pattern that defines the hologram areas to be removed;
   applying a photosensitive polymer layer to the hologram;
   exposing the photosensitive polymer layer in accordance with the mask;
   processing the photosensitive polymer layer to remove the layer from the hologram areas selected to be removed; and
   etching the hologram, whereby the hologram areas corresponding to the removed photosensitive polymer layer areas are removed.

3. The method of claim 1 wherein the step of etching the hologram includes the steps of:
   applying a photosensitive polymer layer to the hologram;
   laser scanning the photosensitive polymer layer to expose the layer in accordance with the pattern;
   processing the photosensitive polymer layer to remove the layer from the hologram areas selected to be removed; and
   etching the hologram, whereby the hologram areas corresponding to the removed photosensitive polymer layer areas are removed.

* * * * *